United States Patent [19]
Dang et al.

[11] Patent Number: 6,119,261
[45] Date of Patent: Sep. 12, 2000

[54] METHOD FOR RECOVERING DATA FROM DISK WITH A DYNAMIC ERASURE OFFSET ECC DATA RECOVERY PROTOCOL

[75] Inventors: Kieu-Lien T. Dang, Hayward; James Vernon Peske, San Jose, both of Calif.

[73] Assignee: Quantum Corporation, Milpitas, Calif.

[21] Appl. No.: 09/040,514

[22] Filed: Mar. 17, 1998

[51] Int. Cl.[7] ................................. G11C 29/00
[52] U.S. Cl. ............................. 714/769; 360/53
[58] Field of Search .................. 714/769; 360/53, 360/46

[56] References Cited

U.S. PATENT DOCUMENTS

| | | | |
|---|---|---|---|
| 5,233,482 | 8/1993 | Galbraith et al. | 360/46 |
| 5,475,540 | 12/1995 | Gold | 360/48 |
| 5,537,034 | 7/1996 | Lewis | 324/212 |
| 5,680,265 | 10/1997 | Noguchi | 360/46 |
| 5,701,314 | 12/1997 | Armstrong et al. | 714/765 |
| 5,754,355 | 5/1998 | Nakamura et al. | 360/73.03 |
| 5,917,670 | 6/1999 | Scaramuzzo et al. | 360/53 |

Primary Examiner—Albert De Cady
Assistant Examiner—Guy Lamarre
Attorney, Agent, or Firm—Fish & Richardson

[57] ABSTRACT

A method for precisely locating and correcting data errors on a magnetic storage disk with a recording head, e.g. an MR head, in the presence of thermal asperities, scratches, or other data signal degradation causes is set forth. The method includes the steps of reading a sector of data and collecting ECC syndromes. At the same time, data errors may be detected and their proximate location determined, whereupon an ECC process is applied for correction of the errors. In the event the detected data errors are not correctable by the ECC, the method repetitively redefines the detected data error location and applies Forney's ECC erasure correction algorithm to each repetition. These repetitions are carried out a predetermined number of times until the data is corrected or the correction attempts are exhausted.

16 Claims, 4 Drawing Sheets

METHOD FOR RECOVERING DATA FROM DISK WITH A DYNAMIC ERASURE OFFSET ECC DATA RECOVERY PROTOCOL

CROSS REFERENCE TO RELATED PATENTS

This invention relates to the following patent application of which is assigned to the assignee of this application as of the date of filing: U.S. patent application Ser. No. 08/734,782 entitled, "METHOD FOR RECOVERING DATA FROM DISK WITH MAGNETO-RESISTIVE HEAD IN THE PRESENCE OF THERMAL ASPERITIES", the disclosure of which is hereby incorporated by reference.

FIELD OF THE INVENTION

The present invention relates to error handling within hard disk drives. More particularly, the present invention relates to a method and structure for recovering data from a storage disk with a magneto-resistive head in the presence of thermal asperities or localized signal degradation.

BACKGROUND OF THE INVENTION

A thermal asperity (TA) is an unwanted event sometimes occurring within hard disk drives employing a magneto-resistive (MR) read head element of a flying head or slider assembly. One way to increase data storage densities in magnetic hard disk drives having disks of a given size is to "fly" the head structure closer and closer to the disk surface than heretofore. Flying heights of one micro-inch are now being approached in hard disk drives. Unfortunately, disk surfaces are not perfectly smooth when viewed in a micro-inch domain. Also, occasional particulate contaminants may come between the slider and the disk surface.

When an MR read element comes into contact with a rough spot of the disk, or collides with a minute, freely moving contaminating particle, virtually instantaneous heating of the MR element occurs. In response to this sudden heating, resistance of the thin film MR stripe element quickly increases. Since a constant bias voltage or current is applied to bias the MR element during reading operations, the sudden increase in resistance is sensed by a preamplifier as a dramatic, rapid change in bias voltage, or a large baseline signal shift. This unwanted electrical signal shift (referred to hereinafter as a "thermal asperity" or "TA") can be several times larger than a signal shift induced by magneto-resistance effect in response to a magnetic flux transition recorded on the disk as user or servo data, etc. Since the read channel has a dynamic operating range optimized to expected signal magnitudes attributable to flux transitions, the out-of-range TA signal shift causes the electronics of the read channel to saturate. Once the read channel saturates, a relatively long time is needed to bring the channel back to nominal baseline operating conditions, and the saturation condition may remain over several subsequent data bit cells. Under a saturation condition, the read channel electronics of the disk drive cannot detect any recorded data transitions accurately. This saturation condition causes data errors at the proximity of the thermal asperity.

Prior approaches directed to correcting these data errors employ conventional error-correction-codes, e.g. ECC, that operate to locate and correct the data errors. However, ECC is limited to correcting a predetermined maximum number of errors that may occur in a data stream.

If the precise location of the errors can be determined prior to operation of the ECC algorithm, then the prior maximum number of correctable errors in a data stream may be substantially increased. Presently, techniques for determining the location of these errors includes thermal asperity detectors or general error detectors that are included within read channel electronics. One problem with these techniques is that error locations cannot be determined with precision, rather, only approximate error locations can be determined.

Another problem with the prior techniques for determining the approximate location of these data errors is that actual errors may not be detected at all and thus their location never realized. In some instances, errors generated as a result of a thermal asperity may not have a voltage amplitude with sufficient amplitude to be detected by a thermal asperity detector. Nevertheless, this low amplitude error may be long enough in time to cause a plurality of data errors that cannot be located and thus are not correctable.

Since prior error location methods can only provide the proximity of a data error, prior ECC schemes need to begin operation substantially before and conclude substantially after the proximate error location to provide a buffer zone for uncertainty of a data error's location. This additional zone for which the ECC must attempt correction of data errors, will sometimes cause the length of the total region to be corrected, to be longer than the maximum correction span of the ECC, causing the error to be uncorrectable.

Thus, a hitherto unsolved need has remained for a more effective method for recovering data from a magnetic recording disk with an MR head in the presence of thermal asperities.

SUMMARY OF THE INVENTION

In accordance with principles of the present invention, a method for precisely locating and correcting data errors on a magnetic storage disk with an MR head in the presence of thermal asperities, scratches, or other data signal degradations causes is set forth. The method includes steps of reading a sector of data and collecting ECC syndromes, then electrically detecting a data error and attempting to detect a proximate data error beginning location and data error ending location. Next a determination is made as to whether a location was detected for the data in error. If the data error is determined to not have a detected location, the protocol applies a conventional ECC process for correcting the data in error. If the data in error is successfully corrected, the protocol exits and returns a correctable flag to the main drive data recovery firmware. However, if the conventional ECC cannot correct the data, then the protocol verifies that a data error location has not been detected and exits the protocol and returns an uncorrectable flag to the drive's main data recovery firmware.

On the other hand, if the data in error is determined to have a detected data error location, then the protocol continues to attempt correction by redefining the data error beginning location to be a predetermined number of contiguous byte positions to the left of the previously detected data error beginning location, e.g. eight contiguous byte positions. Further, the data error ending location is redefined to be a predetermined number of contiguous byte positions to the right of the redefined data error beginning location, e.g. twenty contiguous byte positions.

Next, a counter is set for counting a predetermined number of iterations that the data error beginning location and the data error ending location is redefined. During each count interval, a data correction algorithm is applied to the data in error defined between the data error beginning location and the data error ending location. One preferred data correction algorithm is Forney's ECC erasure correction algorithm. Forney's ECC erasure correction algorithm can be obtained in "© 1972 Error Correcting Codes" (W. Wesley Peterson and E. J. Weldon Jr.).

After application of the correction algorithm, a determination is made as to whether the data in error, which was previously defined between the data error beginning location and the data error ending location, has been corrected. If the data has been corrected, the protocol exits and return a correctable flag to the main drive data recovery firmware. If, however, the data has not been corrected, then the protocol redefines the data error beginning and ending locations and cyclically repeats the above steps until the data in error is corrected or the counter times out. If the counter times out and the data in error has not been corrected, the protocol exits and returns an uncorrectable flag to the main drive data recovery firmware.

These and other objects, advantages, aspects and features of the present invention will be more fully understood and appreciated upon consideration of the following detailed description of a preferred embodiment, presented in conjunction with the accompanying drawings.

DETAILED DESCRIPTION OF A PREFERRED EMBODIMENT

The present invention operates upon a premise that data recovery from TAs or from other data signal degradation causes, such as scratches, may not be performed in real time, because any modifications made to the data channel to enhance data recovery from such events may cause performance degradation during otherwise normal channel operations. Moreover, if a TA or signal degradation is severe, that detected situation alone causes a determination that some types of channel modifications are required for effective data recovery, and those modifications and subsequent detection efforts may not be able to be carried out during real time operation of the disk drive.

Figure 1:
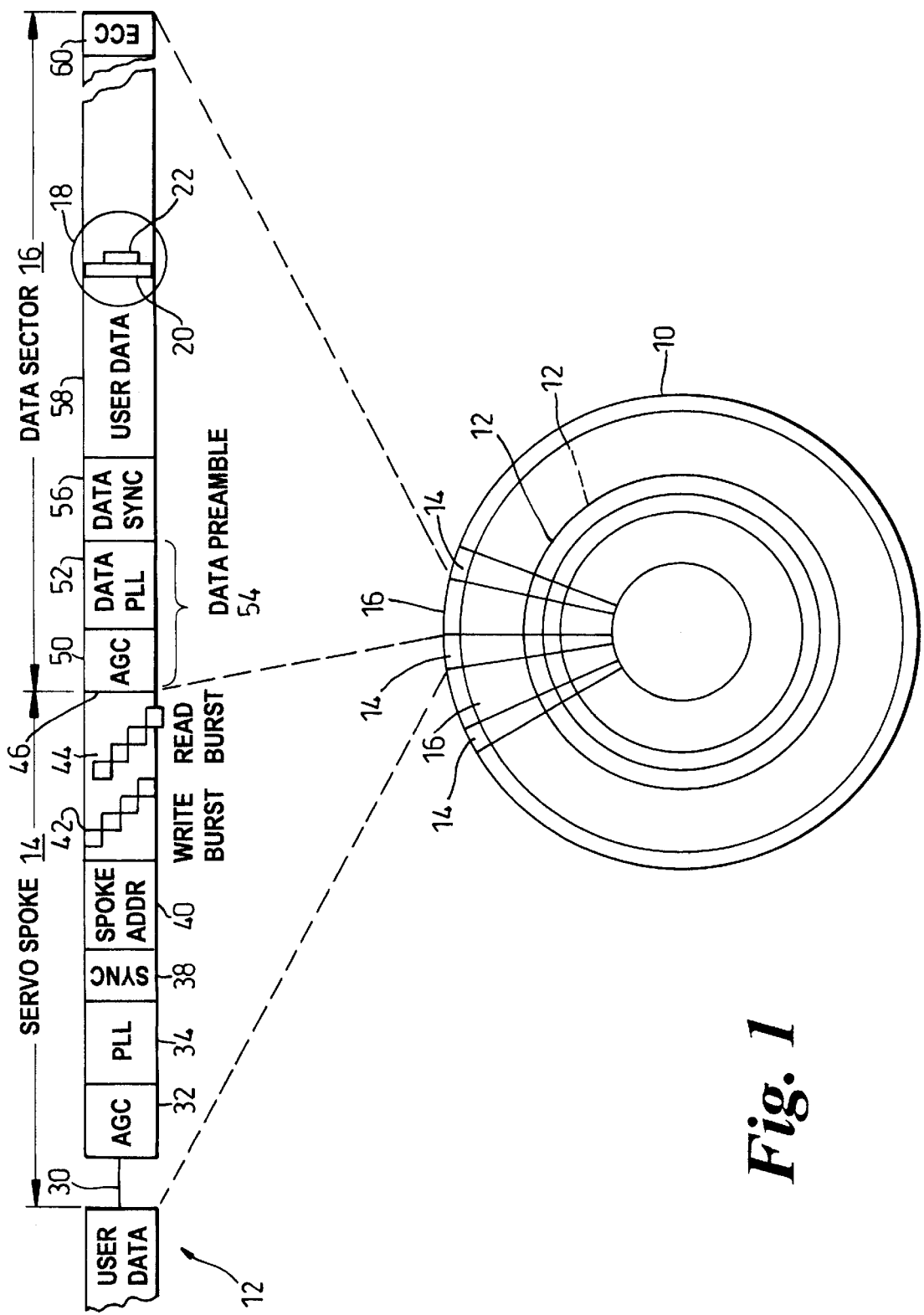
FIG. 1 is a diagram of a storage disk showing a greatly enlarged and linearized depiction of a servo sector and data sector within a circular track format of the FIG. 3 hard disk drive.

Since TAs cause a variety of difficulties, depending upon the type of data being distorted, it is important to record the location of each TA. This importance will be more fully appreciated by considering FIG. 1. In FIG. 1, a rotating data storage disk 10 has at least one formatted data storage surface defining a multiplicity of concentric data tracks 12. Each track 12 is divided up into an alternating pattern of servo sectors or "spokes" 14, and data regions 16. In order to optimize raw data transfer rate, the tracks 12 are banded together into a plurality of radial data zones, such that a data transfer rate is optimized for the tracks within each zone.

Figure 3:
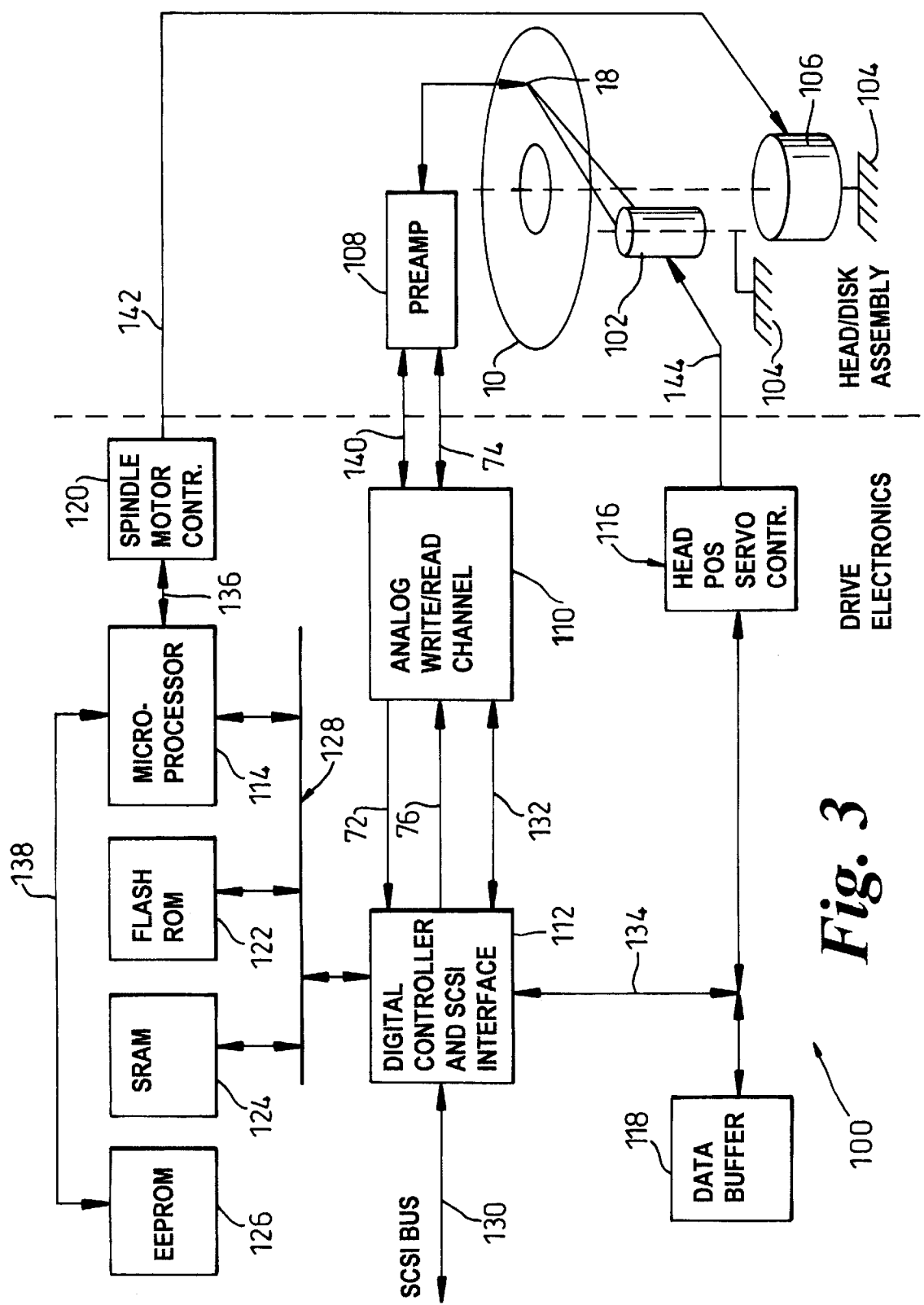
FIG. 3 is an electrical block diagram of a hard disk drive incorporating a data error location and correction protocol in accordance with the present invention.

A head transducer/slider structure 18 "flies" on an air bearing adjacent to the data recording surface. The structure 18 may include a relatively wide inductive write element 20 and a relatively narrow MR read element 22. As shown in FIG. 3, the head/slider structure 18 is typically positioned by a rotary voice coil actuator 102 referenced to a base 104, and an offset or skew is present between the read element 22 and the write element 20, depending upon radial position of the head 18 relative to the disk 10.

As depicted in the greatly enlarged and linearized track segment shown at the top of FIG. 1, each servo spoke 14 may include a DC erase gap 30, a servo AGC field 32, a servo PLL field 34, a servo address sync field 38 (also known as a "servo address mark"), a spoke address field 40, a write burst pattern field 42, and a read burst pattern field 44 (which is offset from the write burst pattern field by the skew angle present at the particular radius of the illustrated track 12). A write-splice region 46 marks beginning of the data sector 16. The data sector 16 may include an AGC field 50 and a data PLL field 52 forming a preamble 54, a data sync pattern field 56 (also known as a "data address mark pattern"), a user data field 58 for storing a known number of user data bytes, and an ECC (and cross-check) field 60 at the end of the data field 58. Usually, although not necessarily, the user data field 52 will hold a standard block size of data, such as 512 or 1024 bytes. In at least some of the data zones, for example, it is expected that the servo spokes 14 will split up at least some of the data fields 52, and each data field will include one or more embedded servo spokes. By inspection of the FIG. 1 track pattern it is apparent that a TA occurring in one of the servo spoke fields could have a different consequence than if the TA occurred during the user data sector 16, or the different fields thereof.

FIG. 3 sets forth a high level block diagram of a hard disk drive 100 incorporating the principles of the present invention. FIG. 3 shows that the disk drive 100 is divided into an electromechanical head/disk assembly and a drive electronics section which is preferably contained on a small printed circuit board mounted to one major wall of the head/disk assembly. The head/disk assembly includes and registers relative positions of the disk 10 and the head structure 18 via a base 104. The head is positioned by the rotary voice coil actuator assembly 102 which is mounted to the base 104. A spindle motor 106 is also mounted to the base 104, and the motor 106 rotates the disk 10 at a predetermined constant angular velocity. While only one disk 10 is shown in FIG. 3, those skilled in the art will appreciate that multiple disks may be stacked on a spindle assembly including the spindle motor 106. In that case, the actuator assembly 102 would include a stack of heads and head arms, each head being associated with a separate data storage surface of an adjacently facing disk. The heads 18 are attached to head arms by load beams and flexures which provide a spring preload function to bias the heads 18 towards the facing disk surfaces. Rotation of the disk(s) 10 by motor 106 creates an air bearing between the head and the adjacent surface, and the head flies on this air bearing in close proximity to the data surface. It is in this regime that thermal asperities occur, because the head 18 is relatively very close to the disk surface (e.g. <1–2 microinches separation). The preamplifier and head selector circuit 108 is also provided within the head/disk assembly in order to be as close to the transducers 18 as practical in order to minimize noise pickup.

The drive electronics may include the analog write/read channel chip 110, a digital controller and interface chip 112, at least one embedded standard microprocessor 114 (also including "glue" logic for the disk drive application), a head position servo controller chip 116, a data buffer array 118, a spindle motor controller 120, a flash ROM 122, a static RAM 124, and an EEPROM 126. The drive electronics includes a number of bus structures including a wideband digital bus 128 between the digital controller 112, microprocessor 114, flash ROM 122, and SRAM 124. An interface bus 130, implementing a conventional bus structure such as a SCSI bus, leads from the digital drive controller 112 to a host computing environment (not shown). A signal bus 132 interconnects the digital drive controller 112, and the analog write/read channel chip 110. This bus 132 carries the TA detect signal from the analog channel chip 110 and/or the preamplifier 108 (via bus 74) to the digital drive controller chip 112, and the TA strobe signal in the opposite direction.

Other buses may include a bus 134 between the digital drive controller and the data buffer 118 and head position servo controller 116, a bus 136 between the microprocessor 114 and the spindle motor controller 120, and a serial bus between the microprocessor 114 and the EEPROM 126. A separate servo microcontroller or digital signal processor (DSP) may also be included for control of the head position servo loop, and in that event, the DSP may be connected between the digital controller ASIC 112 and the head position servo controller 116 control via a suitable bus structure, not shown.

Figure 4:
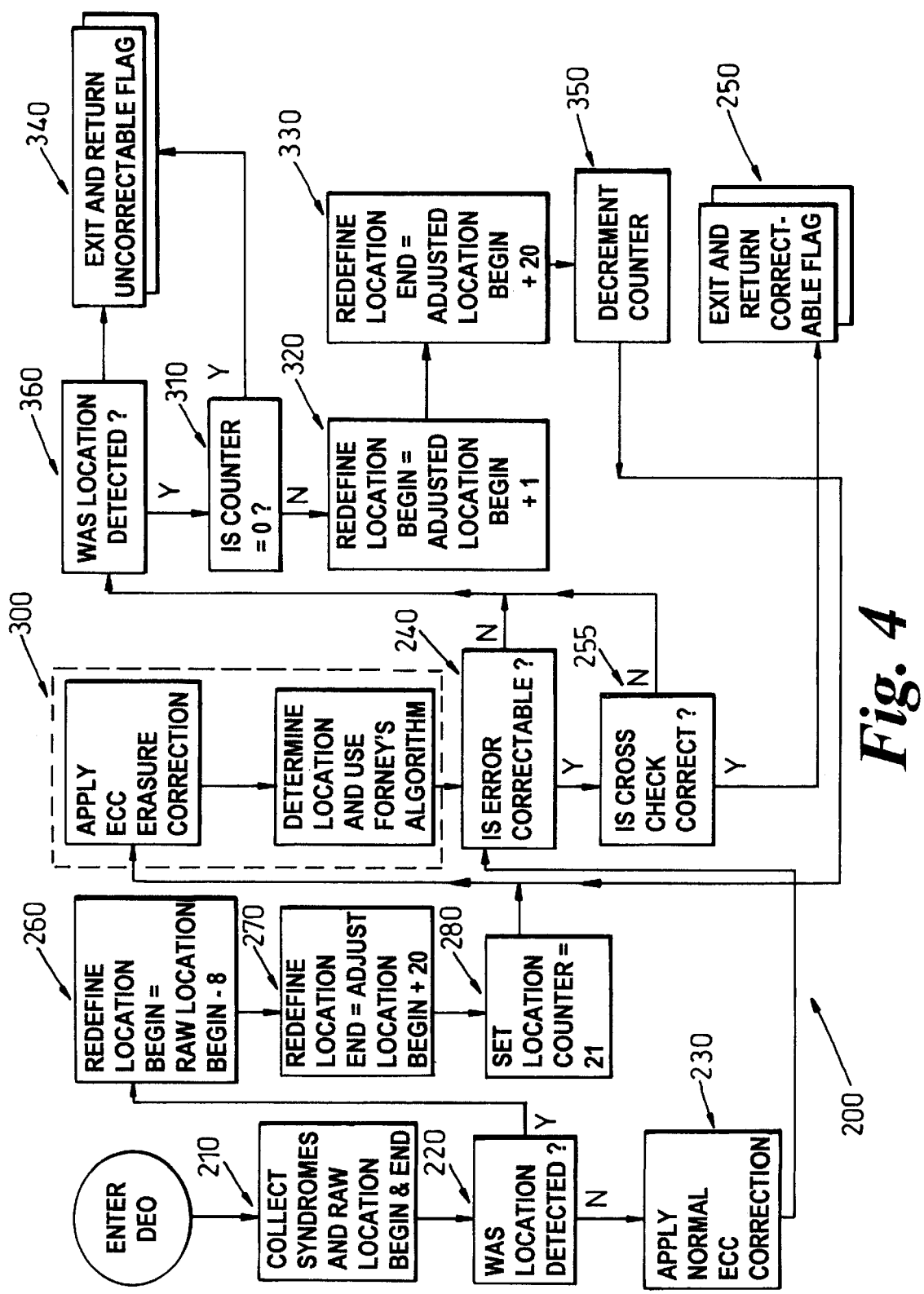
FIG. 4 is a flowchart of a data error location and correction protocol carried out by the FIG. 3 disk drive during data reads in accordance with principles of the present invention.

Turning now to FIG. 4 a global error recovery strategy is implemented in the illustrated firmware flowchart. This firmware is stored in a suitable memory location, such as the flash ROM 122 and called and executed by the microprocessor 114 when a TA or other signal degradation causing data errors is detected by the read channel chip 110.

FIG. 4 illustrates a data error location and correction protocol 200 in accordance with principles of the present invention. The data error location and correction protocol 200 includes a method for precisely determining the location of data errors on a data storage disk 10 and correction of said errors. The method includes the steps of: reading a sector of data and collecting ECC syndromes 210. Thereafter, data errors are detected electrically by any one of several error detection circuits (not shown) such as: a thermal asperity detector; a data signal degradation detector; or any general error detector circuit all of which can be positioned in either the read channel 110 or preamplifier electronics 108.

Figure 2:
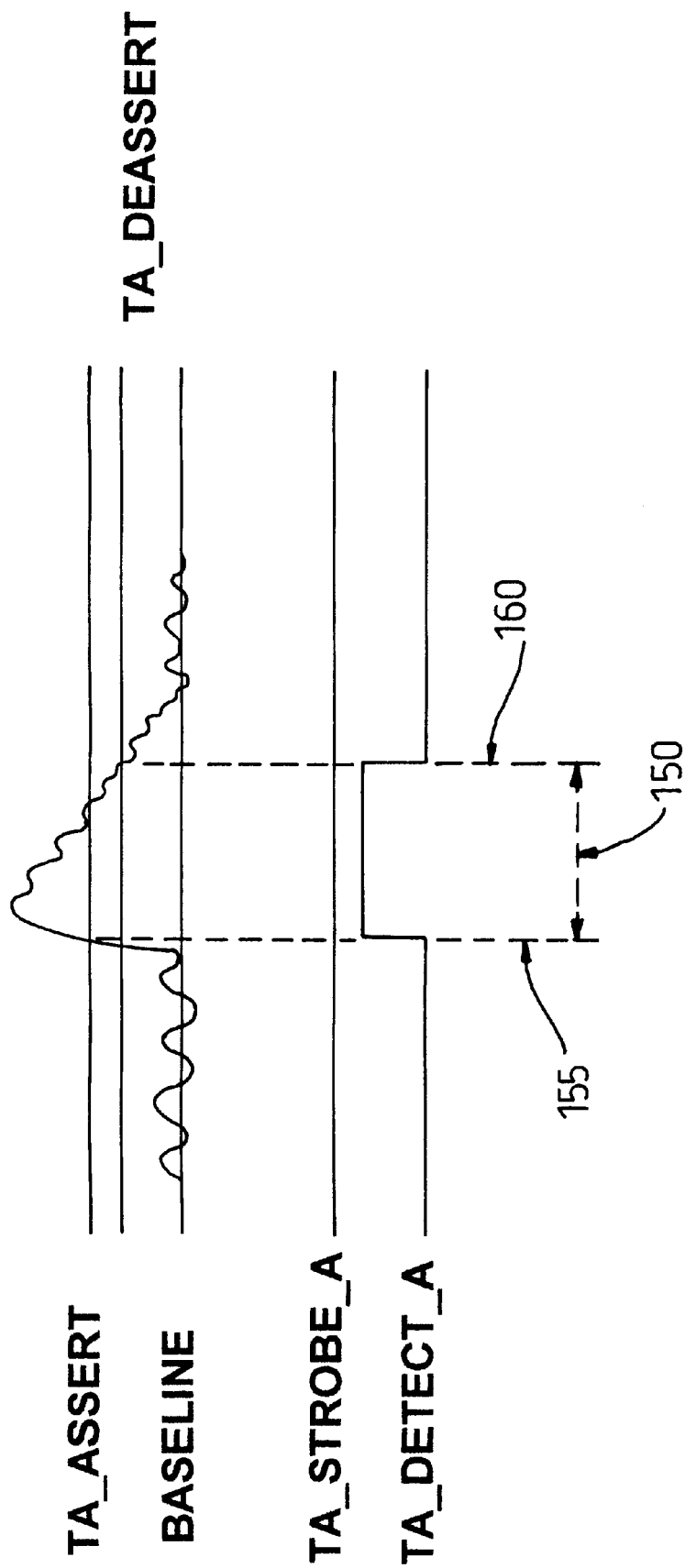
FIG. 2 is a graph of a TA and certain threshold levels and a TA detect signal generated during the TA recovery modes of the present invention, graphed along a common time base axis.

TAs, for example, are detected by the analog read channel chip 110 or the preamplifier 108, and a window, TA_detect 150, is captured in time. As shown in the FIG. 2 graph, this TA_detect window 150 describes the proximate physical boundaries of the TA within the track format 12. This TA_detect window 150 is provided to the firmware so that a proximate data error beginning location 155 and proximate data error ending location 160 can be determined.

Another method for determining the proximate data error beginning location 155 and data error ending location 160 is achieved by reading the data two or more times and comparing each successive read with the previous read, where differing successive reads indicates the data error's proximate beginning 155 and ending 160 locations.

Upon locating the proximate data error location, a determination is made as to whether a location was detected for the data in error. If the data error is determined not to have a detected location, the protocol applies a conventional ECC process 230 to the data in error for correcting the data thereof. Furthermore, if the data in error is successfully corrected, the protocol exits and returns a correctable flag 250 to the main drive data recovery firmware. However, if the conventional ECC process cannot correct the data in error, then the protocol verifies that a data error location has not been detected and exits the protocol and returns an uncorrectable flag to the main drive data recovery firmware 340.

On the other hand, if the data in error is determined to have a detected error location, then the protocol continues to attempt correction by redefining the data error beginning location 260 to be a predetermined number of contiguous byte positions to the left of the previously detected data error beginning location 155, e.g. eight contiguous byte positions. Further, the data error ending location 160 is redefined to be a predetermined number of contiguous byte positions to the right of the redefined data error beginning location 155, e.g. twenty contiguous byte positions.

Next, a counter is set 280 for counting a predetermined number of iterations that the data error beginning location 155 and the data error ending location 160 is redefined. Thus, if the counter is set 280 to twenty-one then the beginning 155 and ending 160 locations of the data error may be redefined twenty-one times before the protocol declares the data error as not locatable and thus not correctable. A data correction algorithm, e.g. Forney's ECC erasure correction algorithm 300, is applied to each subsequent iterative attempt to correct the data defined between the data error beginning location 155 and the data error ending location 160. After each successive attempt to correct the data in error, a determination is made as to whether the data defined between the data error beginning location 155 and the data error ending location 160 has been corrected 240. If the data has been corrected 240, the corrected data is optionally cross-checked with error detection code, i.e., EDC or a parity checker 255. Thereafter, the protocol exits and a correctable flag is returned to the main drive data recovery firmware 250.

If, however, the detected data error is determined as not correctable 240 with application of Forney's ECC erasure correction algorithm 300, the protocol continues to redefine the data in error's beginning 155 and ending 160 locations until the data is corrected 240 or the counter reaches zero 310. More precisely, if the counter is not equal to zero 310 and the data is not corrected, the protocol continues to redefine the data error beginning location 155 to be one contiguous byte position to the right of the previously determined data error beginning location 155. Further, the protocol redefines the data error ending location 160 to be twenty contiguous byte positions to the right of the most recently redefined data error beginning location 155. In this manner, the location of the data in error is dynamically redefined for each successive attempt at correction.

However, if the counter reaches zero 310 and the data has not been corrected by the application of Forney's ECC erasure correction algorithm 300 to each successive data error location 150, the protocol exits and an uncorrectable flag 340 is returned to the main drive data recovery firmware.

After each of the above applications of Forney's ECC erasure correction algorithm 300 to the dynamic data in error locations 150, a counter is decremented 350 and the above steps repeated until said counter is zero 310 or the data is corrected as previously described. These cyclic iterations of the dynamic beginning 155 and ending 160 locations together with application of Forney's ECC erasure correction algorithm 300 to each iteration provides a method of data recovery from a magnetic storage disk 10 that may otherwise be unrecoverable with conventional ECC methods. The above described protocol is not limited to contiguous data errors, rather, the protocol can be applied to a plurality of non-contiguous detected data errors.

Additionally, the above protocol has application with a variety of data storage devices such as tape drives, optical drives, or magneto-optical drives or the like. Generally, a data storage device incorporating a data storage medium for storing and retrieving data to/from the device may incorporate the above described protocol for locating and correcting data errors therein.

The above described method for precisely determining the location of data errors on a data storage disk and correction of said errors 200 has many advantages over the prior art, such as, the correction of data errors that would otherwise be declared as uncorrectable.

Another advantage of the above described method for precisely determining the location of a data errors on a data storage disk and correction of said errors 200, is that the maximum number of errors the ECC can correct is increased because the beginning 155 and ending 160 locations of a detected data error 150 is dynamically redefined until the error is precisely located thereby simplifying the ECC process.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. In a hard disk drive including a rotating data storage disk, a head transducer structure including a magnetoresistive read element and positioned over the disk for data writing and reading operations to and from a formatted track, a read channel connected to the read element, and a digital data handling and control section connected to the read channel for handing data block transfers between the data storage disk and a host computing environment, a method for precisely determining the location of data errors on the data storage disk and correcting the errors comprising the steps of:

(A) reading a sector of data and collecting ECC syndromes;

(B) electrically detecting a data error and determining a proximate data error beginning location and proximate data error ending location;

(C) determining if the detected data error has a detected error cation,
 (a) if the data error does not have a detected error location then applying ECC and determining if the data has been corrected,
  (i) if the data has been corrected then returning a correctable flag to the main drive data recovery firmware,
  (ii) if the data has not been corrected then verifying that that there was no detected error location and returning an uncorrectable flag to the main drive data recovery firmware;

(D) if it was determined that the data error has a detected error location then redefining the data error beginning location at a predetermined number of contiguous byte positions prior to the data error beginning location determined in step (B);

(E) redefining the data error ending location at a predetermined number of byte positions after the redefined data error beginning location determined in step (D);

(F) setting a counter for counting a predetermined number of iterations of the redefinition of the data error beginning location and the data error ending location;

(G) applying a data correction algorithm to the data defined between the data error beginning location and the data error ending location;

(H) determining if the data defined between the data error beginning location and the data error ending location has been corrected and if the data has been corrected then returning a correctable flag to the main drive data recovery firmware.

2. The method of claim 1 wherein if it was determined that the data has not been corrected, then the method further comprising the steps of:

(I) determining if the counter equals zero and if the counter equals zero then returning a uncorrectable flag to the main drive data recovery firmware;

(J) if it was determined that the counter is not equal to zero, redefining the data error beginning location at a predetermined number of byte positions after the data error beginning location determined in step D;

(K) redefining the data error ending location at a predetermined number of byte positions after the redefined data error beginning location determined in step (J);

(L) decrementing the counter;

(M) repeating steps (G)–(L) until either:
 (i) data error has been corrected and returning a correctable flag to the main drive data recovery firmware; or
 (ii) the counter equals zero and returning an uncorrectable flag to the main drive data recovery firmware, wherein the repetition of steps (G)–(L) provides a method for recovering data from the data storage disk with a dynamic erasure offset ECC data recovery protocol.

3. The method for precisely determining the location of a data errors on the data storage disk and correction of said errors of claim 2, wherein the data error beginning location is redefined one contiguous byte position after the data error beginning location determined in step D.

4. The method for precisely determining the location of a data errors on the data storage disk and correction of said errors of claim 3, wherein the data error ending location is defined twenty contiguous byte positions after the redefined data error beginning location.

5. The method for precisely determining the location of a data errors on the data storage disk and correction of said errors of claim 2, wherein steps (A)–(M) are applied to a plurality of non-contiguous detected data errors.

6. The method for precisely determining the location of a data errors on the data storage disk and correction of said errors of claim 1, wherein the data error beginning location is redefined eight contiguous byte positions prior to the beginning of data error location.

7. The method for precisely determining the location of a data errors on the data storage disk and correction of said errors of claim 6, wherein the data error ending location is redefined twenty contiguous byte positions after the previously redefined beginning of data error location.

8. The method for precisely determining the location of a data errors on the data storage disk and correction of said errors of claim 1, wherein the data correction algorithm is Forney's ECC erasure correction algorithm.

9. The method for precisely determining the location of a data errors on the data storage disk and correction of said errors of claim 1, wherein the step of electrically detecting a data error and determining a proximate data error beginning location and data error ending location is realized with a thermal asperity detector positioned in the read channel electronics.

10. The method for precisely determining the location of a data errors on the data storage disk and correction of said errors of claim 1, wherein the step of electrically detecting a data error and determining a proximate data error beginning location and data error ending location is realized with a thermal asperity detector positioned in the preamplifier electronics.

11. The method for precisely determining the location of a data errors on the data storage disk and correction of said errors of claim 1, wherein the step of electrically detecting a data error and determining a proximate data error beginning location and data error ending location is realized with a data signal degradation detector positioned in the read channel electronics.

12. The method for precisely determining the location of a data errors on the data storage disk and correction of said errors of claim 1, wherein the step of electrically detecting a data error and determining a proximate data error beginning location and data error ending location is realized with a data signal error detector positioned in the read channel electronics.

13. The method for precisely determining the location of a data errors on the data storage disk and correction of said errors of claim 1, wherein the step of electrically detecting a data error and determining a proximate data error beginning location and data error ending location is determined by reading the data two or more times and comparing each successive read with the previous read where differing successive reads indicates the data error and proximate beginning and ending locations.

14. The method for precisely determining the location of a data errors on the data storage disk and correction of said errors of claim 1, wherein step (H) further comprises the step of cross-checking the corrected data with an error detection code.

15. In a data storage device having a data storage medium for storing and retrieving data to/from the device, the data storage device handling data block transfers between the data storage device and a host computing environment, the data storage device including a method for precisely determining the location of data errors on the data storage medium and correction of said errors, comprising the steps of:

(A) reading a sector of data and collecting ECC syndromes;

(B) electrically detecting a data error and determining a proximate data error beginning location and proximate data error ending location;

(C) determining if the detected data error has a detected error location,
  if the data error does not have a detected error location then apply ECC and determine if the data has been corrected,
    (i) if the data has been corrected then returning a correctable flag to the main device data recovery firmware,
    (ii) if the data has not been corrected then verifying that that there was no detected error location and returning an uncorrectable flag to the main device data recovery firmware;

(D) if it was determined that the data error has a detected error location then redefining the data error beginning location at a predetermined number of contiguous byte positions before the data error beginning location determined in step (B);

(E) redefining the data error ending location at a predetermined number of byte positions after the redefined data error beginning location determined in step (D);

(F) setting a counter for counting a predetermined number of iterations of the redefinition of the data error beginning location and the data error ending location;

(G) applying a data correction algorithm to the data defined between the data error beginning location and the data error ending location;

(H) determining if the data defined between the data error beginning location and the data error ending location has been corrected and if the data has been corrected then returning a correctable flag to the main device data recovery firmware.

16. The method claim 15 wherein if it was determined that the data has not been corrected, then the method further comprising the steps of:

(I) determining if the counter equals zero and if the counter equals zero then returning a uncorrectable flag to the main device data recovery firmware;

(J) if it was determined that the counter is not equal to zero then redefining the data error beginning location at a predetermined number of byte positions after the data error beginning location determined in step D;

(K) redefining the data error ending location at a predetermined number of byte positions after the redefined data error beginning location determined in step (J);

(L) decrementing the counter;

(M) repeating steps (G)–(L) until either:
  (i) data error has been corrected and returning a correctable flag to the main device data recovery firmware; or
  (ii) the counter equals zero and returning a uncorrectable flag to the main device data recovery firmware, wherein the repetition of steps (G)–(L) provides a method for recovering data from the data storage device with a dynamic erasure offset ECC data recovery protocol.

* * * * *